(12) United States Patent
Godbillon et al.

(10) Patent No.: US 10,184,637 B2
(45) Date of Patent: Jan. 22, 2019

(54) LIGHTING AND/OR SIGNALING DEVICE FOR A MOTOR VEHICLE AND MANUFACTURING METHOD

(71) Applicant: VALEO VISION, Bobigny (FR)

(72) Inventors: Vincent Godbillon, Bobigny (FR); Pierre Albou, Bobigny (FR); Marc Brassier, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/547,311

(22) PCT Filed: Jan. 29, 2016

(86) PCT No.: PCT/EP2016/051960
§ 371 (c)(1),
(2) Date: Jul. 28, 2017

(87) PCT Pub. No.: WO2016/120459
PCT Pub. Date: Aug. 4, 2016

(65) Prior Publication Data
US 2018/0023780 A1   Jan. 25, 2018

(30) Foreign Application Priority Data

Jan. 29, 2015   (FR) ..................... 15 50685

(51) Int. Cl.
| | |
|---|---|
| *F21S 45/50* | (2018.01) |
| *F21S 45/46* | (2018.01) |
| *F21S 45/30* | (2018.01) |
| *B60Q 1/00* | (2006.01) |
| *F21V 31/00* | (2006.01) |
| *F21V 31/03* | (2006.01) |

(52) U.S. Cl.
CPC ............ *F21S 45/50* (2018.01); *B60Q 1/0005* (2013.01); *F21S 45/30* (2018.01); *F21S 45/46* (2018.01); *F21V 31/005* (2013.01); *F21V 31/03* (2013.01)

(58) Field of Classification Search
USPC ........................................................ 362/547
See application file for complete search history.

(56) References Cited

U.S. PATENT DOCUMENTS

2009/0059594 A1   3/2009   Lin
2010/0232167 A1   9/2010   Michalak et al.

FOREIGN PATENT DOCUMENTS

DE   10 2005 044 446 A1   3/2007
DE   10 2013 213 542 A1   1/2015
(Continued)

OTHER PUBLICATIONS

International Search Report dated Apr. 11, 2016, in PCT/EP2016/051960 filed Jan. 29, 2016.
(Continued)

*Primary Examiner* — Matthew Mikels
(74) *Attorney, Agent, or Firm* — Oblon, McClelland, Maier & Neustadt, L.L.P.

(57) ABSTRACT

A lighting and/or signaling device for a motor vehicle, including an internal chamber housing an optical system and at least one element made of polymer material having a surface directed toward the interior of the chamber, wherein the surface directed toward the interior of the chamber is provided with a sealing layer forming a barrier to the ingress of water molecules to the chamber. The method for manufacturing such a device is also a subject of the invention.

17 Claims, 1 Drawing Sheet

(56) References Cited

FOREIGN PATENT DOCUMENTS

| EP | 0 859 188 A2 | 8/1998 |
| EP | 0 859 188 A3 | 8/1998 |
| WO | WO 2010/104552 A2 | 9/2010 |
| WO | WO 2010/104552 A3 | 9/2010 |

OTHER PUBLICATIONS

French Search Report dated Nov. 23, 2015. in French Application 1550685 filed Jan. 29, 2015.

LIGHTING AND/OR SIGNALING DEVICE FOR A MOTOR VEHICLE AND MANUFACTURING METHOD

The invention relates to a lighting and/or signaling device for a motor vehicle, such as a headlight or a rear light, comprising a casing, an outer lens and an optical system, and its manufacturing method.

The casing, sealed by the outer lens, forms a closed internal chamber which houses the optical system. The device is generally produced in such a way as to be tight to the ingress of water and, more generally, of liquid or solid polluting elements which could degrade the optical system and/or the quality of the lighting.

A total seal-tightness is however not desirable. In effect, the internal pressure in the chamber is likely to vary because of the internal temperature changes induced by the repeated heatings and coolings of the optical system, depending on whether the latter is on or off. To avoid any deformation of the device, it is therefore best to balance the pressure between the interior and the exterior of the device by allowing air to pass. The result thereof is that humidity-filled air is likely to penetrate into the chamber. When the temperature of the air contained in the chamber, subjected to a given pressure and humidity, reaches its dew point the formation of water droplets occurs through condensation. This phenomenon is recurrent and has the effect of degrading the quality of the lighting and of producing an unsightly appearance.

There are various techniques for managing the humidity inside the casing.

A first known technique consists in applying a hydrophilic lacquer, capable of preventing the formation of water droplets because it generates the creation of a water film that is uniform and of uniform thickness, on certain surfaces, inside the chamber, for example on the internal face of the outer lens. Thus, the esthetic appearance is preserved.

A second known technique consists in providing the device with a ventilation system which permanently circulates the air between the interior and the exterior of the device so as to avoid a build-up of humidity inside the chamber.

These two techniques can be used independently of one another or to complement one another.

The present invention proposes to further improve the situation.

To this end, the invention relates to a lighting and/or signaling device for a motor vehicle, comprising an internal chamber housing an optical system and at least one element made of polymer material having a surface directed toward the interior of the chamber, noteworthy in that said surface directed toward the interior of the chamber is provided with a sealing layer forming a barrier to the ingress of water molecules into the chamber.

An element, or part, made of polymer material exhibits a certain porosity, or permeability to water. When it is in contact with liquid water or with humidity-filled air, the element tends to absorb the water, which can then subsequently re-emerge. Take the example of a motor vehicle lighting and/or projection device casing, whose walls are produced in a polymer material. Because of the humidity present in the environment inside and/or outside the casing, water molecules penetrate into the walls of the casing, through the outer and/or inner faces thereof. This absorbed water subsequently re-emerges from the walls, potentially to the interior of the casing which increases the humidity inside the casing even more. By virtue of the invention, the water having penetrated the walls of the casing is prevented from re-emerging toward the interior of the casing and forced to be dispelled to the outside.

Advantageously, the sealing layer is in contact with the interior of the chamber and the surface of the element made of polymer material directed toward the interior of the chamber constitutes a surface common to the element made of polymer material and to the sealing layer. Finally, the sealing layer is inserted directly between the interior of the chamber and the polymer material.

The element made of polymer material can be a wall of a casing delimiting said chamber or a pipe for circulating a coolant.

In a first embodiment, the sealing layer is deposited on the surface of the element made of polymer material directed toward the interior of the chamber.

In this case, advantageously, said deposited sealing layer has a thickness less than or equal to 120 nm, notably between 60 and 80 nm.

In a second embodiment, the sealing layer is a surface layer of the element made of polymer material, treated so as to be made tight to the passage of water molecules. Preferentially, the treatment consists of an exposure to an ion bombardment of the surface of the element made of polymer material.

Preferably, the surface layer of polymer material is cross-linked.

According to a variant embodiment, the device further comprises a dehumidifying element capable of extracting the humidity from the air before the latter penetrates into the chamber through a connecting opening between the interior of the chamber and the exterior.

According to another variant embodiment, in addition or as an alternative, the device comprises a ventilation element capable of circulating the air between the interior of the chamber and the exterior.

The invention relates also to a method for manufacturing a lighting and/or signaling device for a motor vehicle, comprising an internal chamber housing an optical system and at least one element made of polymer material having a surface directed toward the interior of the chamber, noteworthy in that it comprises a step of treatment of the surface directed toward the interior of the chamber to produce a sealing layer forming a barrier to the ingress of water molecules into the chamber.

In a first embodiment, the treatment step comprises the deposition of a coating layer of sealing material on the surface of the element made of polymer material directed toward the interior of the chamber.

Advantageously, the deposition is performed by a plasma-assisted chemical vapor phase deposition technique (PECVD).

In a second embodiment, the treatment step comprises an ion bombardment of the surface of the element made of polymer material directed toward the interior of the chamber in order to produce a sealing surface layer in the element made of polymer material.

The invention will be better understood from the following description of two exemplary embodiments of the lighting and/or signaling device for a motor vehicle and of two particular embodiments of the method for manufacturing the device, with reference to the attached drawings in which:

First, note that the corresponding elements represented on the different figures bear the same references, unless indicated otherwise.

FIG. 1 shows, schematically, a lighting and/or signaling device for a motor vehicle, according to a first exemplary embodiment of the invention.

Figure 1:
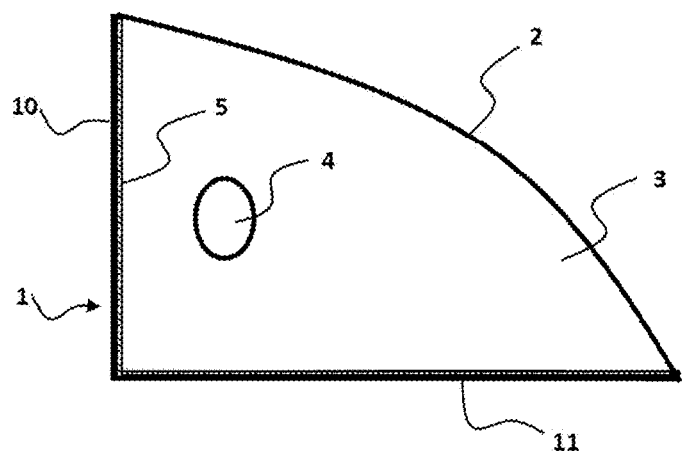
FIG. 1 represents a first exemplary embodiment of the device of the invention.

The lighting and/or signaling device comprises a casing 1, closed by an outer lens 2, an internal chamber 3 consisting of the closed interior space delimited by the casing 1 and by the outer lens 2, and an optical system 4 housed inside the chamber 3.

As is known, the device comprises a connecting opening, not represented, between the interior and the exterior of the chamber 3, and suitable for allowing air to pass between the interior of the chamber 3 and the exterior, while being tight to the ingress of solid or liquid elements such as water, dust, mud, etc. This opening also allows a regulation of the internal pressure inside the chamber 3, in order to avoid an excessive increase thereof likely to be provoked by the heat given off by the optical system.

Furthermore, in the particular example described here, the device is provided with a dehumidifying element, not represented, suitable for extracting the humidity from the air before the latter penetrates into the chamber through the opening. This dehumidifying element can be similar to that described in the document EP2306084.

Complementarily or alternatively, the device can also be provided with a ventilation element suitable for establishing a circulation of air between the chamber 3 and the exterior so as to refresh the air in the chamber 3 and avoid a build-up of humidity inside the chamber 3.

The dehumidifying module and/or the ventilation element make it possible to reduce the humidity of the air inside the chamber 3.

The casing 1 comprises two bottom walls 10, 11 and two side walls (not represented), produced in a polymer material. In the particular example described here, the polymer material used to produce the walls of the casing 1 is PP TD 40, that is to say homopolymer polypropylene 40% filled with talc. It would be possible to envisage using another polymer material for the walls of the casing 1 such as one of the following materials, taken alone or in the form of an alloy, if necessary filled: polyurethane (PU), polyamide (PA), polyester (PE), polypropylene (PP), acrylonitrile butadiene styrene (ABS), polycarbonate (PC).

The internal surfaces of the walls of the casing 1, that is to say those which are directed toward the interior of the chamber 3, are each provided with a sealing layer 5 forming a barrier to the ingress of water molecules into the chamber 3. The sealing layer 5 of a wall here consists of a water-tight material deposited on the internal surface of the wall. It is inserted directly between the polymer material forming the wall of the casing 1 and the interior of the chamber 3. Thus, the sealing layer 5 has a surface in contact with the interior of the chamber 3 and a surface in common with the wall of the casing 1.

Remember here that the walls of the casing 1, produced in a polymer material, exhibit a certain porosity, or permeability, notably to water. As an illustrative example, a wall made of polyamide is capable of absorbing between 4 and 10% of its weight in water. The walls of the casing 1 act as sponges: they absorb water molecules from the humidity of the air, inside or outside, in contact with the walls and subsequently release this water, under certain ambient temperature, pressure and humidity conditions. The sealing layer 5 with which each internal face of a wall of the casing 1 is provided acts as a barrier preventing the water absorbed by the walls from re-emerging to the interior of the casing 1, in other words into the chamber 3, and forcing it to re-emerge to the outside.

The sealing layer 5 has a thickness of a few tens of nanometers, for example between 25 and 80 nm, preferably between 60 and 80 nm. It is produced by plasma-assisted chemical vapor phase deposition technique (or PECVD, Plasma-Enhanced Chemical Vapor Deposition), according to the treatment method which will now be described. This treatment is performed during the method for manufacturing the lighting and/or projection device.

In a first step, the areas of the casing 1 not to be treated, here the external faces of the casing 1, are covered using a stainless steel mask.

In a second step, the casing 1 is placed in a chamber of a PECVD device, on a rotary cylindrical support.

The PECVD device comprises, as is known, a system for injecting gas into the chamber and electrodes. The latter are here powered by an MF generator of medium frequency operating with a power of 10 KW and capable of generating a frequency of 10 to 100 kHz, preferentially 40 kHz.

In a third step, the sealing layer 5 is deposited on the internal faces of the walls of the casing 1, by operating the PECVD device, for a given treatment time, with the following operating parameters:

pressure inside the chamber of the device of the order of $5 \cdot 10^{-2}$ mbar;

injection into the chamber, in gas form, of hexamethylene disiloxane at a flow rate of between 20 and 80 sccm (standard cubic centimeters per minute) and of oxygen at a flow rate of 80 sccm;

application of a power of 4 kW to the electrodes;

rotational driving of the support of the part to be treated at a speed of 20 revolutions per minute.

The treatment time is for example 60 seconds.

The treatment layer thus obtained is a polysiloxane compound and has a thickness of 60 to 80 nm and a very low permeability to water vapor P(STP), as defined by the standard ISO 15 106-3, equal to 0.001 g·mm/m$^2$·24 h. The polymer PP TD 40 for its part exhibits a permeability to water vapor P(STP) equal to 1 g·mm/m$^2$·24 h.

The operating parameter values indicated above are given by way of illustrative and nonlimiting example. They can vary to an extent to make it possible to produce a coating layer that is tight to the passage of water molecules having a thickness less than or equal to 120 nm, preferentially 80 nm and preferably greater than or equal to 1 nm, preferentially 10 nm, more preferentially 20 nm.

Instead of the hexamethylene disiloxane, it would be possible to use another compound, notably another polysiloxane such as tetramethyl disiloxane or hydrocarbon derivatives (methane, ethane, ethylene).

In a variant embodiment, each wall of the casing 1 is provided with a sealing layer 5 consisting of a surface layer of the wall itself, treated by physical, chemical or physicochemical means, so as to be rendered tight. The treatment is applied to the internal face of each wall and has the effect of modifying the physical properties of the polymer material, to a given thickness of the meterial, so as to render it water-tight. The polymer material can for example be crosslinked by ion bombardment of the internal surface of the wall. The sealing surface layer obtained has a thickness of the order of a few tens to a few hundreds of nanometers. This sealing surface layer is in contact with the interior of the chamber 3 by its internal surface which is in common with the internal surface of the wall.

To produce a sealing surface layer on a wall of the casing 1, the same PECVD equipment can be used equipped with an ion beam treatment unit. During the treatment, the pressure inside the chamber is set to approximately $5.10^{-2}$ mbar. The ions used for the treatment are for example singly-charged nitrogen ions N+ having an energy of 35 keV. The treatment time is for example 20 seconds. The treatment consists in bombarding the internal face of each wall of the casing 1 with N+ ion beams, for a time of 20 seconds, so as to obtain a sealing surface layer. The permeability P(STP) of the layer of polymer PP TD 40 treated by ion bombardment is equal to 0.01 g·mm/m²·24 h. The operating parameters of the PECVD device for the ion bombardment of the internal faces of the casing, indicated above, are given in a purely illustrative and nonlimiting manner. They can vary to a certain extent so as to form a sealing surface layer with a thickness of between 10 and 2000 nm in particular.

Figure 2:
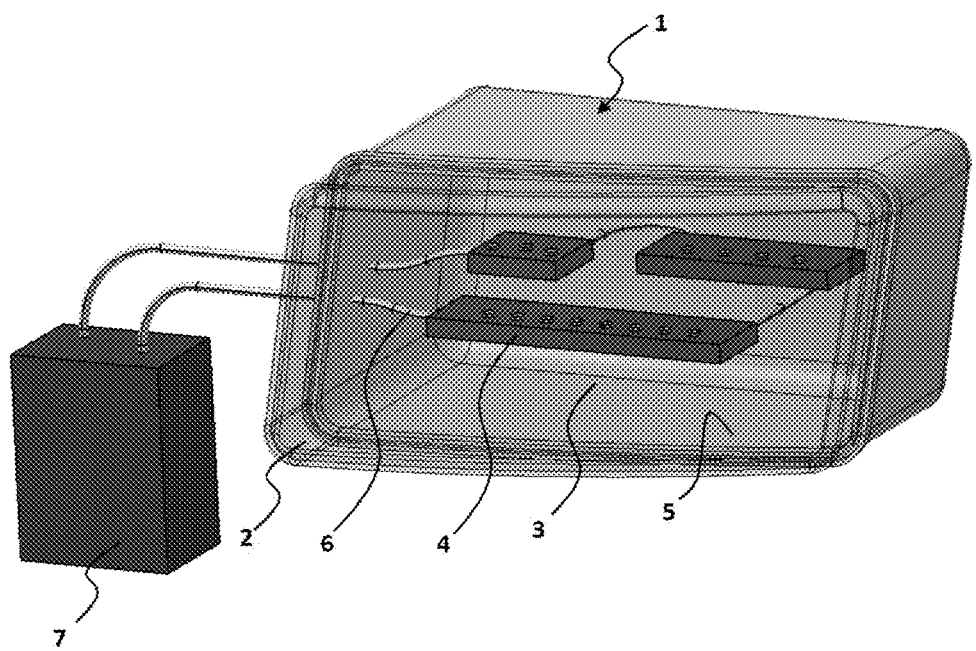
FIG. 2 represents a second exemplary embodiment of the device of the invention.

FIG. 2 shows a second exemplary embodiment of a lighting and/or projection device of a motor vehicle.

The lighting and/or signaling device represented in FIG. 2 comprises a casing 1, closed by a front outer lens 2, an internal chamber 3 defined by the closed interior space delimited by the casing 1 and by the outer lens 2, and an optical system 4 housed inside the chamber 3. The optical system 4 here comprises diodes mounted on support strips.

The device also comprises, inside the chamber 3, cooling pipes 6, through which a coolant, for example water, circulates. The pipes 6 are linked to an external block, through a wall of the casing 1. The external block comprises a pump for circulating the coolant in a closed circuit and a fluid cooling element.

The pipes are produced in a polymer material such as, for example, polyurethane, polyamide, polyester or polypropylene. The outer surface of the pipes, directed toward the interior of the chamber 3, is provided with a layer tight to the ingress of water molecules into the chamber 3. This sealing layer is produced either by deposition of a layer of sealing material, for example by PECVD, or by ion bombardment making it possible to modify a surface layer of the wall of the pipe and make it tight, as described previously.

Generally, any part made of polymer material situated inside the chamber 3 of the casing 1 is provided, on a surface directed toward the interior of the chamber, with a sealing layer forming a barrier to the ingress of water molecules into the chamber. The sealing layer is in contact with the interior of the chamber and the surface of the part made of polymer material directed toward the interior of the chamber constitutes a surface common to the part made of polymer material and to the sealing layer. This sealing layer is produced either by deposition of a sealing material on the surface of the part directed toward the interior of the chamber, for example by PECVD, or by ion bombardment of the surface of the part directed toward the interior of the chamber.

The invention claimed is:

1. A lighting and/or signaling device for a motor vehicle, comprising:
an internal chamber housing an optical system and at least one element made of polymer material having a surface facing an interior of the chamber, wherein the surface facing the interior of the chamber includes a sealing layer forming a barrier to an ingress of water molecules into the chamber, and the sealing layer is in between the interior of the chamber and the surface facing the interior of the chamber.

2. The device according to claim 1, wherein the sealing layer is in contact with the interior of the chamber and the surface of the element made of polymer material facing the interior of the chamber constitutes a surface common to the element made of polymer material and to the sealing layer.

3. The device according to claim 1, wherein the element made of polymer material is a wall of a casing delimiting the chamber.

4. The device according to claim 1, wherein the element made of polymer material is a pipe to circulate a coolant.

5. The device according to claim 1, wherein the sealing layer is deposited on the surface of the element made of polymer material facing the interior of the chamber.

6. The device according to claim 5, wherein said deposited sealing layer has a thickness between 60 and 80 nm.

7. The device according to claim 1, wherein the sealing layer is a surface layer of the element made of polymer material, treated to prevent the passage of water molecules.

8. The device according to claim 7, wherein the surface layer of polymer material is cross-linked.

9. The device according to claim 1, further comprising a dehumidifying element to extract humidity from external air before penetration into the chamber through a connecting opening between the interior of the chamber and an exterior of the chamber.

10. The device according to claim 1, further comprising a ventilation element to circulate air between the interior of the chamber and an exterior of the chamber.

11. The device according to claim 2, wherein the element made of polymer material includes a wall of a casing delimiting the chamber.

12. The device according to claim 2, wherein the element made of polymer material includes a pipe for circulating a coolant.

13. The device according to claim 2 wherein the sealing layer is deposited on the surface of the element made of polymer material facing the interior of the chamber.

14. The device according to claim 2, wherein the sealing layer is a surface layer of the element made of polymer material, treated to prevent the passage of water molecules.

15. The device according to claim 2, wherein the sealing layer comprises a dehumidifying element to extract humidity from external air before penetration into the chamber through a connecting opening between the interior of the chamber and an exterior of the chamber.

16. The device according to claim 2, wherein the sealing layer comprises a ventilation element to circulate air between the interior of the chamber and an exterior of the chamber.

17. The device according to claim 5, wherein said deposited sealing layer has a thickness less than or equal to 120 nm.

* * * * *